United States Patent Office 3,208,182
Patented Sept. 28, 1965

3,208,182
BAIT CASTING AND FISHING BOBBER
Rainsford B. Holthaus, P.O. Box 1133, Washington St., Rapid City, S. Dak.
Filed Apr. 1, 1964, Ser. No. 356,492
2 Claims. (Cl. 43—41.2)

This invention relates to a bait casting and fishing bobber and has for an object to provide an improved fishing bobber for use particularly in connection with live bait, or other soft bait, but also useable with other types of baits or lures, to protect the bait from damage while it is being cast, and the term "bait" as hereinafter used includes any type of bait or lure that may be used in conjunction with this invention.

A further object of this invention is to provide a casting and fishing bobber in combination with a slidable sleeve on the fishing line to support the fishing line with the bait suspended therefrom at a readily adjustable desired depth therebelow in the water.

A further object of this invention is to provide a fishing bobber which will support and protect the bait as it is being cast into the water.

A further object of this invention is to provide a fishing bobber that not only protects the bait as it is being cast but also acts as a bobber to support the baited end of the line at any desired depth and at the same time provide a visible indicator of the location of the suspended fishing line.

A further object of this invention is to provide a slidable sleeve on a fishing line for readily adjusting the depth at which the baited end of the line may be supported on a bobber.

Still a further object of this invention is to provide a slidable, depth adjusting sleeve on a fishing line which will not pass through the line supporting eye of a fishing bobber, but which will pass through the line guides of a fishing pole.

Still a further object of this invention is to provide a fishing bobber and bait protector made of a test tube shaped tube having a plug therein providing an air chamber at its closed end and having a reinforced lip at its other end with an adjacent hole through which a snap swiveled eye for the fishing line may be secured, the tube having a bleed hole adjacent the plug preferably on the opposite side so that the bobber will float approximately upright partly out of the water to act as a location indicator.

With the above and related objects in view, this invention consists in the details of construction and combination of parts, as will be more fully understood from the following description, when read in conjunction with the accompanying drawings in which:

FIG. 1 is a partly elevational and partly sectional view of the bobber of this invention, ready for casting.

FIG. 2 is an elevational view of the bobber in floating position.

FIG. 3 is a section view on line 3—3 through the bobber tube.

FIG. 4 is an enlarged detail view of the slidable, fishing line adjusting sleeve or knot.

There is shown at 10 the bait casting and fishing bobber of this invention. This bobber 10 comprises a test tube shaped tube 12, preferably of semiflexible plastic. The tube 12 has a hemispherical closed end 14, within which an air chamber 16 is provided by inserting a plug 18 suitably secured therein, either by being a sufficiently tight fit, or by using a suitable adhesive, or both. The plug 18 may be of cork, plastic foam, or other suitable, lightweight material that is either waterproof, or capable of being waterproofed. As shown, the plug 18 is inserted approximately half way into the tube 12, and adjacent the plug 18, a bleed hole 20 is provided in one side of the tube 12.

The open end of the tube 12 is provided with a reinforcing ring or lip 22. Adjacent this lip reinforced end of tube 12, and preferably on the side of the tube 12 approximately diametrically opposite the side in which the bleed hole 20 is located, there is provided a snap swivel securing hole 24. Secured through this hole 24 and extending about the reinforcing lip 22 is the snap hook 26 of a snap swivel member 28, the lip 22 diminishing the chances of the snap hook 26 tearing out of the tube 12. Secured to this snap swivel member 28, by interengaging rings 30, is a swivel 32 to which is swivelly secured a fishing line receiving eye 34 of suitable small diameter.

Threaded through the eye 34 is the fishing line 36, consisting preferably of the conventional monofilament plastic line or other very small but sufficiently strong diameter line such as a six, eight, ten or twelve pound test line. However, heavier lines may be used for larger fish, and the swivel eye 34 will be appropriately larger. Clamped on the line 36, about six or eight inches from the fish hook 40 secured at the end of the fishing line 36, is the split shot or other suitable sinker 38, a live minnow being shown as the soft bait which may be used. The diameter of the sinker 38 is greater than that of the swivel eye 34 thus preventing the line 36 from passing therethrough in the direction of the hooked end of the line 36.

A sleeve 44, of greater diameter than the opening in swivel eye 34 is slidably secured on the fishing line 36 between the swivel eye 34 and the end of the fishing pole 46. The slidable sleeve 44 will however, readily pass through the conventional line guides 48 on the fishing pole 46, and will not interfere either with the casting of the line or the winding up of the line through the guides 48 and onto any conventional spring casting reel (not shown) on the fishing pole 46.

One siutable form of sleeve 44, which will hold its position on the monofilament plastic fishing line 36 against letting the line 36 slide any further through the swivel 34 is made of a piece of sewing thread 50 which is wrapped about the fishing line 36 as shown in FIG. 4. As shown, the thread 50 is first wrapped about the line 36, then passed under the first wrap 52, and pulled tight, then wrapped again about the line 36 and again pulled tight, and wrapped again for several wrappings and pulled tight each time, and then both ends of the thread 50 are tied together in a tight double knot 54 and cut off, to provide a sleeve of greater diameter than the diameter of the swivel eye 34, but small enough to pass through the fishing pole line guides 48 and onto the fishing reel. As thus made, the sleeve or knot 44 may be slid along the fishing line 36 to adjust the length of line 36, as desired, that is suspended from the swivel eye 34 on the uprightly floating bobber tube 12.

In operation, the bait, such as a minnow 42, is stuck on the hook 40, and the hooked bait 42, is then inserted into the open end of the tube 12, preferably with its tail against the plug 18, as this is the more protecting position therefor, with the line 36 drawn through the swivel eye 34 until the sinker 38 abuts the eye 34. Usually, the bobber tube 12 will be otherwise empty, but, if desired to add weight to assist in making a cast, the tube may also be filled with soft mud 58 as shown, or any other readily available weighting material, such as gravel or the like, or even water, in which case the bleed hole 20 is temporarily plugged with soft mud 58 or other readily available soluble material. Then, as the bait containing bobber 10 is cast, the bait 42 remains therein, the greater shock thereto taking place at the initial casting operation, the bobber slowing down until it strikes the surface of the water 56, whereupon the buoyant closed end 14 of the tube 12 will cause this end to float upright, with the bleed hole 20 providing escape for any entrapped air, while the open end to which the attaching swivel member 28 is secured, being weighted thereby and by the contained bait 42 and hook 40, as well as the attached sinker 38, will turn downward into the water, dropping the bait 42 to descend into the water 56 to the limit provided by the line 36 readily sliding through the swivel eye 34 until the swivel eye 34 is abutted by the sleeve 44 to hold the baited hook 42 at the desired depth. The fisherman may readily change the length of fishing line 36 between the bobber 10 and the baited hook 42 by sliding the sleeve 44 to any desired position, and then the sleeve will remain in such adjusted position, for different kinds of fish often stay at different depths. The closed hemispherical end 14 of the bobber tube 12 will float above the surface of the water 56 as shown in FIG. 2 to indicate the location from which the baited hook 42 is suspended, for a slight pull by the fishing rod 46 thereon will cause ripples on the water surface even if there is no wind. Also, the plastic tube 12 may be made of a plastic colored to contrast with the water, and thus increase its visibility.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A bait casting and fishing bobber comprising a tube closed at one end and open at the other end, an enlarged reinforcing lip extending about said open end, a plug secured part way within said tube providing a closed air chamber within said tube between said plug and said closed end, said tube having a bleed hole in one side thereof adjacent said plug on the open tube end side of said plug, and also having a fishing line securing hole adjacent said enlarged reinforcing lip about said open end, said tube being made of semiflexible plastic, said closed end of said tube being hemispherical in shape, said fishing line securing hole being on the opposite side from said bleed hole, a fishing line snap swivel having a securing snap hook extending about said reinforcing lip and through said adjacent fishing line securing hole, said snap swivel also having a swivel eye rotatably secured thereto, and a fishing line threaded through said swivel eye, fish catching bait holding means on said fishing line, a fishing line weight secured on said fishing line on the fish catching portion thereof on one side of said swivel eye, and a readily slidable sleeve slidably secured on said fishing line on the other side of said swivel eye, said sleeve being a greater diameter than said swivel eye and preventing further passage of said line through said eye.

2. The bobber of claim 1, said slidable sleeve comprising a portion of sewing thread wrapped several times about the fishing line with its end tied in a double knot, each successive wrap of said thread being passed under each previous wrap and pulled tight.

References Cited by the Examiner
UNITED STATES PATENTS

| | | | |
|---|---|---|---|
| 2,033,701 | 3/36 | Gibbs | 43—43.15 XR |
| 2,554,318 | 5/51 | Wardrip et al. | 43—41.2 |
| 2,910,798 | 11/59 | Bias | 43—41.2 |
| 3,063,187 | 11/62 | Abdelmaseh | 43—41.2 |

FOREIGN PATENTS 63,589    8/27    Sweden.

ABRAHAM G. STONE, *Primary Examiner.*